United States Patent
Titterington et al.

(10) Patent No.: US 7,064,230 B2
(45) Date of Patent: *Jun. 20, 2006

(54) PHASE CHANGE INK FORMULATION CONTAINING A COMBINATION OF A URETHANE RESIN, A MIXED URETHANE/UREA RESIN, A MONO-AMIDE AND A POLYETHYLENE WAX

(75) Inventors: Donald R. Titterington, Tualatin, OR (US); Jeffrey H. Banning, Hillsboro, OR (US)

(73) Assignee: Xerox Corporation, Stamford, CT (US)

(*) Notice: Subject to any disclaimer, the term of this patent is extended or adjusted under 35 U.S.C. 154(b) by 36 days.

This patent is subject to a terminal disclaimer.

(21) Appl. No.: 10/804,425

(22) Filed: Mar. 18, 2004

(65) Prior Publication Data

US 2004/0176634 A1 Sep. 9, 2004

Related U.S. Application Data

(60) Division of application No. 09/654,735, filed on Sep. 5, 2000, now Pat. No. 6,730,150, which is a continuation-in-part of application No. 09/013,410, filed on Jan. 26, 1998, now Pat. No. 5,994,453, which is a continuation-in-part of application No. 08/672,815, filed on Jun. 28, 1996, now Pat. No. 5,830,942, application No. 09/654,735, which is a continuation-in-part of application No. 09/078,190, filed on May 13, 1998, now Pat. No. 6,620,228, which is a continuation-in-part of application No. 08/672,816, filed on Jun. 28, 1996, now Pat. No. 5,782,966.

(51) Int. Cl.
*C07C 271/24* (2006.01)

(52) U.S. Cl. .................................................. 560/115

(58) Field of Classification Search ................. 560/115
See application file for complete search history.

(56) References Cited

U.S. PATENT DOCUMENTS

| | | | |
|---|---|---|---|
| 2,409,712 A | 10/1946 | Schweitzer | |
| 3,012,991 A | 12/1961 | Schultheis et al. | |
| 3,653,932 A | 4/1972 | Berry et al. | |
| 3,963,710 A | 6/1976 | Aufdermarch, Jr. | |
| 4,011,311 A | 3/1977 | Noomen et al. | |
| 4,293,470 A | 10/1981 | Cuscurida | |
| 4,297,501 A | 10/1981 | Becker et al. | |
| 4,334,032 A | 6/1982 | Patton, Jr. et al. | |
| 4,381,403 A | 4/1983 | Falcone et al. | |
| 4,390,369 A | 6/1983 | Merritt et al. | |
| 4,484,948 A | 11/1984 | Merritt et al. | |
| 4,501,915 A | 2/1985 | McCoy | |
| 4,537,960 A | 8/1985 | Merger et al. | |
| 4,665,146 A | 5/1987 | Tortorello et al. | |
| 4,684,956 A | 8/1987 | Ball | |
| 4,810,820 A | 3/1989 | Slack et al. | |
| 4,851,045 A | 7/1989 | Taniquchi | |
| 4,889,506 A | 12/1989 | Connolly et al. | |
| 4,889,560 A | 12/1989 | Jaeger et al. | |
| 4,889,761 A | 12/1989 | Titterington et al. | |
| 5,006,170 A | 4/1991 | Schwarz et al. | |
| 5,151,120 A | 9/1992 | You et al. | |
| 5,195,430 A | 3/1993 | Rise | |
| 5,221,335 A | 6/1993 | Williams et al. | |
| 5,372,852 A | 12/1994 | Titterington et al. | |
| 5,389,720 A | 2/1995 | Markusch et al. | |
| 5,389,958 A | 2/1995 | Bui et al. | |
| 5,496,879 A | 3/1996 | Griebel et al. | |
| 5,621,022 A | 4/1997 | Jaeger et al. | |
| 5,750,604 A | 5/1998 | Banning et al. | |
| 5,777,023 A | 7/1998 | Pavlin | |
| 5,780,528 A | 7/1998 | Titterington et al. | |
| 5,782,966 A | 7/1998 | Biu et al. | |
| 5,783,658 A | 7/1998 | Banning et al. | |
| 5,827,918 A | 10/1998 | Titterington et al. | |
| 5,830,942 A | 11/1998 | King et al. | |
| 5,881,648 A | 3/1999 | Pavlin | |
| 5,919,839 A | 7/1999 | Titterington et al. | |
| 5,994,453 A | 11/1999 | Banning et al. | |
| 6,015,847 A * | 1/2000 | Titterington et al. | 523/160 |
| 6,048,925 A | 4/2000 | Titterington et al. | |
| 6,057,399 A | 5/2000 | King et al. | |
| 6,180,692 B1 * | 1/2001 | Bridgeman et al. | 523/161 |
| 6,620,228 B1 | 9/2003 | King et al. | |
| 6,663,703 B1 * | 12/2003 | Wu et al. | 106/31.29 |
| 6,673,139 B1 * | 1/2004 | Wu et al. | 106/31.29 |

(Continued)

FOREIGN PATENT DOCUMENTS

DE 42 0 636 A1 8/1993

(Continued)

OTHER PUBLICATIONS

J. H. Saunders, K. C. Frisch, "Polyurethanes Chemistry and Technology, Part 1. Chemistry," High Polymers vol. XVI, Part 1, pp. 64, 65, 72–75., date unavailable.

(Continued)

Primary Examiner—Rabon Sergent
(74) Attorney, Agent, or Firm—Wells St. John P. S.

(57) ABSTRACT

Phase change ink carrier compositions comprising an admixture of (1) at least one urethane resin; and/or (2) at least one mixed urethane/urea resin; and/or (3) at least one mono-amide; and/or (4) at least one polyethylene wax are provided. In addition, a phase change colored ink of such carrier compositions comprising a phase change ink compatible colorant are also provided. Embodiments of the present invention also include methods for producing a layer of the above phase change colored ink on the surface of a substrate by either direct or indirect printing. Such methods also encompassing using a polyethylene wax as an overcoat layer above such a phase change ink layer on a printed substrate.

6 Claims, 1 Drawing Sheet

U.S. PATENT DOCUMENTS

| | | | |
|---|---|---|---|
| 6,726,755 B1 * | 4/2004 | Titterington et al. | 106/31.29 |
| 6,730,150 B1 * | 5/2004 | Titterington et al. | 106/31.43 |
| 6,755,902 B1 * | 6/2004 | Banning et al. | 106/31.29 |
| 6,761,758 B1 * | 7/2004 | Boils-Boissier et al. | 106/31.29 |
| 6,764,541 B1 * | 7/2004 | Banning et al. | 106/31.29 |
| 6,790,267 B1 * | 9/2004 | Banning et al. | 106/31.29 |
| 6,811,595 B1 * | 11/2004 | Boils-Boissier et al. | 106/31.29 |
| 6,811,596 B1 * | 11/2004 | Bedford et al. | 106/31.29 |
| 6,821,327 B1 * | 11/2004 | Jaeger et al. | 106/31.29 |
| 6,835,238 B1 * | 12/2004 | Wu et al. | 106/31.29 |
| 6,858,070 B1 * | 2/2005 | Wong et al. | 106/31.61 |
| 6,860,931 B1 * | 3/2005 | Wu et al. | 106/31.29 |
| 6,872,243 B1 * | 3/2005 | Breton et al. | 106/31.29 |
| 6,878,198 B1 * | 4/2005 | Drappel et al. | 106/31.86 |

FOREIGN PATENT DOCUMENTS

| | | |
|---|---|---|
| DE | 42 05 713 A1 | 8/1993 |
| EP | 0 187 352 A2 | 7/1986 |
| EP | 0 206 286 A1 | 12/1986 |
| GB | 2 294 939 A | 5/1996 |
| WO | WO 94/04619 | 3/1994 |
| WO | WO 94/14902 | 7/1994 |
| WO | WO 97/12003 | 4/1997 |
| WO | WO 97/13816 | 4/1997 |

OTHER PUBLICATIONS

"Polymer Chemistry —The Basic Concepts" by Paul C. Hiemenz, California State Polythechnic University, Pomona, California, p. 7, 1984.

"Technical Product Information" IUXATE® Isophorone Diisocyanate, by Olin Chemicals, Olin Corporation, 2 pgs., 1995.

Advanced Organic Chemistry Reactions, Mechanisms, and Structure, Third Edition, by Jerry March, Professor of Chemistry, Adelphi University, 6 pgs., 1985.

Sax et al.; *Hawley's Condensed Chemical Dictionary, Eleventh Edition*; Van Nostrand Reinhold; New York; 1987; p. 974.

* cited by examiner

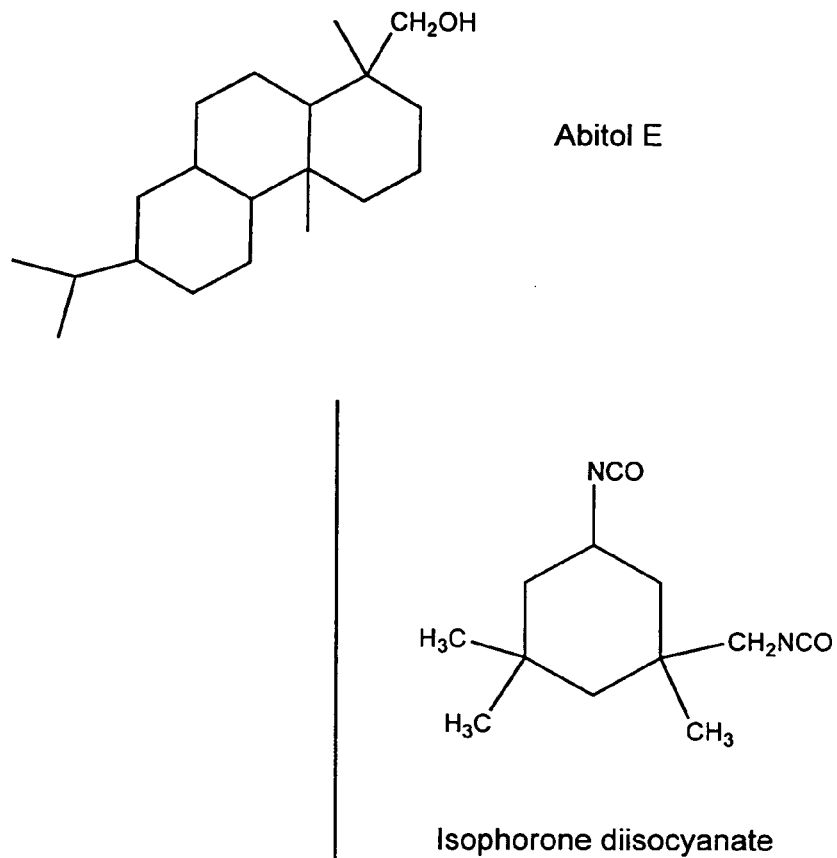
Abitol E
Isophorone diisocyanate
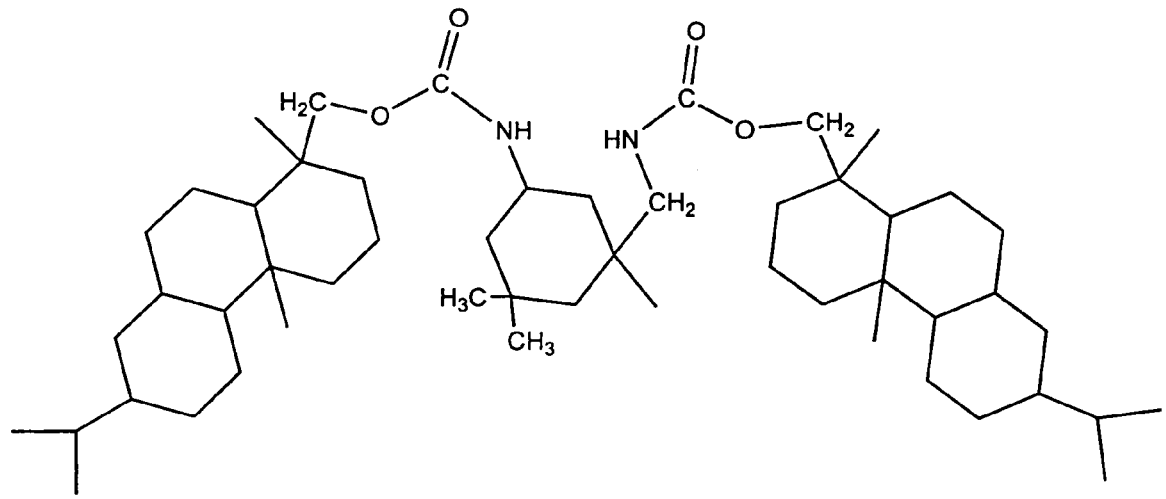

PHASE CHANGE INK FORMULATION CONTAINING A COMBINATION OF A URETHANE RESIN, A MIXED URETHANE/UREA RESIN, A MONO-AMIDE AND A POLYETHYLENE WAX

CROSS-REFERENCE TO RELATED APPLICATIONS

This patent resulted from a divisional of U.S. patent application Ser. No. 09/654,735, filed Sep. 5, 2000, now U.S. Pat. No. 6,730,150, which is a continuation-in-part of U.S. patent application Ser. No. 09/013,410, filed Jan. 26, 1998, now U.S. Pat. No. 5,994,453; which is a continuation-in-part of U.S. patent application Ser. No. 08/672,815, filed Jun. 28, 1996, now U.S. Pat. No. 5,830,942, U.S. patent application Ser. No. 09/654,735, now U.S. Pat. No. 6,730,150, is also a continuation-in-part of U.S. patent application Ser. No. 09/078,190, filed May 13, 1998, now U.S. Pat. No. 6,620,228, which is a continuation-in-part of U.S. patent application Ser. No. 08/672,816, filed Jun. 28, 1996, now U.S. Pat. No. 5,782,966.

BACKGROUND

1. Field of the Invention

The present invention relates generally to phase change inks. Still further, the present invention relates to processes of using phase change inks in printing devices. Additionally, the present invention relates to processes of using polyethylene wax as a transparent overcoat layer on a printed substrate to provide improved document feed capability from photocopiers.

2. Description of the Relevant Art

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops. Phase change inks have also been investigated for use in other printing technologies such as gravure printing as referenced in U.S. Pat. No. 5,496,879 and German patent publications DE 4205636AL and DE 4205713AL assigned to Siegwerk Farbenfabrik Keller, Dr. Rung and Co.

Phase change inks for color printing generally comprise a phase change ink carrier composition, which is combined with a phase change ink compatible colorant. Preferably, a colored phase change ink will be formed by combining the above-described ink carrier composition with compatible subtractive primary colorants. The subtractive primary colored phase change inks can comprise four component dyes, namely, cyan, magenta, yellow and black. U.S. Pat. Nos. 4,889,506; 4,889,761; and 5,372,852 teach that the subtractive primary colorants employed typically may comprise dyes from the classes of Color Index (C.I.) Solvent Dyes, Disperse Dyes, modified Acid and Direct Dyes, and a limited number of Basic Dyes. The colorants can also include pigments as exemplified in U.S. Pat. No. 5,221,335, assigned to Coates Electrographics LTD. U.S. patent application Ser. No. 08/381,610, filed Jan. 30, 1995, and assigned to Tektronix, Inc. (now U.S. Pat. No. 5,621,022), is directed to the use of a specific class of polymeric dyes in phase change ink compositions.

Phase change inks are desirable for ink jet printers since they remain in a solid phase at room temperature during shipping, long-term storage, and the like. Also, the problems associated with nozzle clogging due to ink evaporation are largely eliminated, thereby improving the reliability of ink jet printing. Furthermore, ink droplets can be applied directly onto a printing medium (substrate) and be configured to solidify immediately upon contact with the substrate. Migration of ink along the printing medium can thus be prevented and dot quality improved.

In addition to the above-referenced U.S. patents, many other patents describe materials for use in phase change ink jet inks. Some representative examples include U.S. Pat. Nos. 3,653,932; 4,390,369; 4,484,948; 4,684,956; 4,851,045; 4,889,560; 5,006,170; and 5,151,120; as well as EP Application Nos. 0187352 and 0206286. These materials can include paraffins, microcrystalline waxes, polyethylene waxes, ester waxes, fatty acids and other waxy materials, fatty amide-containing materials, sulfonamide materials, resinous materials made from different natural sources (tall oil rosins and rosin esters are an example) and many synthetic resins, oligomers, polymers and co-polymers.

Separately, PCT Patent Application WO 94/14902, which was published on Jul. 7, 1994 and is assigned to Coates Brothers PLC, teaches a hot melt ink containing a colorant and, as a vehicle for the hot melt ink, an oligourethane having a melting point of at least 65° C. and obtained by reacting an aliphatic or aromatic diisocyanate with at least a stoichiometric amount of either: (i) a monohydric alcohol component; or (ii) a monohydric alcohol component followed by another different monohydric alcohol component; or (iii) a monohydric alcohol component, followed by a dihydric alcohol component, followed by a monohydric alcohol component.

This PCT patent application defines the monohydric alcohol component as either a monohydric aliphatic alcohol (e.g. $C_1$ to $C_{22}$ alcohols), an etherified dihydric aliphatic alcohol (e.g. propylene glycol methyl ether (PGME), dipropylene glycol methyl ether (DPGME), ethylene glycol butyl ether (EGBE), diethylene glycol butyl ether (DPGBE), tripropylene glycol butyl ether (TPGBE) and propylene glycol phenyl ether (PPL)); esterified dihydric aliphatic alcohol (e.g. the esterifying acid may be an ethylenically unsaturated acid (such as acrylic acid or methacrylic acid), thereby introducing ethylenic unsaturation into the oligourethane and rendering it suitable for eventual further additional polymerization (curing) after having been applied to a substrate by hot melt printing), or dihydric polyalkylene glycol. This PCT Application further defines the dihydric alcohol component as a dihydric aliphatic alcohol or a dihydric polyalkylene glycol (e.g. ethylene glycol, polyethylene glycol (PEG 1500), polypropylene glycol (PPG 750, 1000 and 1500), trimethylene glycol, dipropylene glycol, methylpropanediol and 1,6-hexanediol).

Also, PCT Patent Application WO 94/04619, assigned to the General Electric Company, teaches the use of ionomeric materials in combination with image forming agents to form a hot melt ink jet ink. The ionomeric materials can include many different types of copolymeric or polymeric ionomers, including carboxyl-functional polyurethanes prepared from a diol or polyol and a hydroxyl acid. Many other carrier materials and colorants for the image forming agent of the invention are included in this PCT application.

Furthermore, U.S. patent application Ser. No. 08/672,815, (now U.S. Pat. No. 5,830,815) assigned to the Assignee of the present invention, teaches phase change carrier compositions that comprise the combination of a urethane resin with a urethane/urea resin that may optionally contain other ingredients such as mono-amides and polyethylene waxes.

However, there is still a need for new materials for novel and different applications of phase change carrier compositions and inks containing such carrier compositions. There is a also a need for low viscosity phase change carrier compositions and inks having non-polymeric resins and waxes designed for phase change ink jet and other forms of phase change ink printing. Such carrier compositions and inks being substantially transparent and having a reduced surface coefficient of friction as compared to presently known carrier compositions and inks. It would be advantageous if ink sticks which have an improved surface appearance and better release from molds and waste collection trays than previously known ink sticks could also be formed from such carrier compositions and inks. Additionally, it would be desirable if such phase change ink and carrier compositions include improved blocking performance of finished prints than has been previously known.

BRIEF DESCRIPTION OF THE FIGURE

The FIGURE is a schematic diagram of a chemical reaction utilized in particular aspects of the present invention.

SUMMARY

Embodiments in accordance with the present invention are directed to phase change carrier compositions comprising an admixture of (1) at least one urethane resin; and/or (2) at least one mixed urethane/urea resin; and/or (3) at least one mono-amide; and/or (4) at least one polyethylene wax.

Embodiments of the present invention are also directed to phase change ink compositions comprising the admixture of (a) the above-noted phase change carrier composition with (b) a phase change ink compatible colorant.

Embodiments of the present invention include methods for producing a layer of a phase change colored ink on the surface of a substrate by either direct or indirect printing wherein the phase change ink composition in the solid phase comprises an admixture of (a) the above-noted phase change carrier composition and (b) a phase change ink compatible colorant.

Other embodiments in accordance with the present invention encompass methods for using a polyethylene wax as an overcoat layer above a phase change ink layer on a printed substrate such as a sheet of paper.

Features of embodiments of the present invention directed to phase change carrier compositions, include a low viscosity, being substantially transparent and having a reduced surface coefficient of friction.

Features of embodiments in accordance with the present invention directed to phase change inks include ink sticks which have an improved surface appearance and better release from molds and waste collection trays than previously known ink sticks. Additional features of such phase change ink embodiments also include improved blocking performance of finished prints than has been previously known.

Advantageously, embodiments in accordance with the present invention encompassing phase change carrier compositions can be design engineered to obtain desired properties for specific printing platforms and architectures.

In addition, embodiments of the present invention that include phase change inks are resins or waxes which are very pure and that are essentially free of salts and other insoluble contaminants generally found in previously known phase change inks.

DETAILED DESCRIPTION

The term "nucleophile" in the present specification and claims is used as defined on page 179 of "Advanced Organic Chemistry", 3rd Edition by Jerry March, 81985 by John Wiley and Sons, to describe a reagent that brings an electron pair to a reaction to form a new bond. The preferred nucleophiles of this invention are alcohols or amines, but it is understood that other nucleophilic functional groups that are capable of reacting with the isocyanate moiety could also be used in the invention.

The term "oligomer" in the current specification and claims is used as defined on page 7 of "Polymer Chemistry—The Basic Concepts" by Paul Hiemenz, 81984 by Marcel Dekker, Inc., to describe a term coined to designate molecules for which n (representing the number of repeating monomer units) is less than 10.

The term "isocyanate-derived resin" as used in the present specification and claims is defined as any monomeric, oligomeric or non-polymeric resinous material derived from the reaction of mono-, di-, or poly-isocyanates with suitable nucleophilic molecules.

The terms "isocyanate-derived wax" as used in the present specification and claims is defined as any crystalline or semicrystalline waxy material derived from the reaction of a fatty isocyanate with a suitable-nucleophile, or the reaction of a fatty nucleophile with a suitable isocyanate, or the reaction of a fatty nucleophile with a fatty isocyanate.

The term "urethane resin" or "urethane isocyanate-derived resin" as used in the present specification and claims is defined as any resin that is a urethane which is the product of the reaction of an isocyanate and an alcohol.

The term "mixed urethane/urea resin" or "urethane/urea isocyanate-derived resin" as used in the present specification and claims is defined as any resin that is a mixed urethane/urea which is the product of the reaction of an isocyanate, an alcohol and an amine.

Any suitable reaction condition for making urethane resins or mixed urethane/urea resins by condensing alcohols and/or amines with isocyanates can be employed in the practice of the present invention. Generally, the reaction is carried out at elevated temperatures (e.g. about 60° C. to about 160° C.) in the presence of a urethane reaction catalyst such as dibutyltindilaurate, bismuth tris-neodecanoate, cobalt benzoate, lithium acetate, stannous octoate or triethylamine. The reaction conditions are typically an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol or amine typically remaining. Conceptually the reactants can be added together in any order and/or added to the reaction as physical mixtures. However, in some embodiments in accordance with the present invention, reaction conditions and the order of the addition of reactants are controlled. First, reaction conditions and reactant additions are selected to provide a controlled exothermic reaction. Secondly, when reacting mixtures of alcohols and/or amines with diisocyanates such as isophorone diisocyanate (IPDI), the order of addition of the isocyanate and the different nucleophiles to the reaction is chosen to tailor the distribution of diurethane molecules, and/or mixed urethane/urea molecules, and/or diurea molecules in the final resin. When doing this, the different reactivities to isocyanates of alcohols versus amines are employed, as are the different reactivities of the two separate isocyanate groups on IPDI. See J. H. Saunders and K. C. Frisch's "Polyurethanes Part I, Chemistry" published by Interscience of New York, N.Y. in 1962 and Olin Chemicals' Luxate™ IM isophorone diisocyanate technical product information sheet which provide further explanation of this chemistry. This control of the reaction conditions and order of addition of the reactants is done to specifically tailor or customize the different types of molecular species in the finished resin so that the resin will:

(1) have a controlled viscosity that is designed for a specific application, (2) have a controlled glass transition temperature and/or melting point, and (3) have consistent properties from batch to batch.

The isocyanate-derived resins from these reactions are generally transparent solids having melting points in the range of about 20° C. to about 150° C., viscosities in the range of about 10 cPs to about 5000 cPs at 150° C. and $T_g$'s (glass transition point) of about −30° C. to about 100° C. The isocyanate-derived waxes from these reactions are generally opaque waxy solids having sharp melting points from about 50° C. to about 130° C., and viscosities of about 1 cPs to about 25 cPs at 140° C. Such resins and waxes display properties such that the higher the $T_g$ and the melting point, the higher the viscosity. While the structural activity relationships are not fully understood, it is known that the $T_g$ of isocyanate-derived resins is controlled by the proper choice of the mixture of nucleophiles in the reaction as illustrated in Table 3 in the aforementioned U.S. application Ser. No. 08/672,815 (now U.S. Pat. No. 5,830,942). Varying one or more of the readily available commodity chemicals used as chemical precursors will permit custom-tailoring of the properties of the isocyanate-derived resin and wax materials.

Alcohols employed in some embodiments of the present invention to react with difunctional and higher isocyanates to make either the urethane resins or the urethane/urea resins of this invention include monohydric alcohols. For instance, such monohydric alcohol encompass any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol [e.g., benzyl alcohol, octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like). In some embodiments of the present invention, other alcohols are employed and include N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like. In some embodiments, small amounts (on a molar basis) of polyols are incorporated into the reaction mixture to produce oligomeric species in the resins. Such polyols include, hydroabietyl alcohol, octylphenol ethoxylate and octadecyl alcohol.

Embodiments in accordance with the present invention employ amines to react with difunctional and higher isocyanates to make mixed urethane/urea resins. Such amines include any monofunctional amine, with the exception of any tertiary amine void of another nucleophilic functional group (e.g., triethylamine). Thus, mono-amines of some embodiments of the present invention encompass aliphatic primary or secondary amines (e.g., a $C_1$–$C_{22}$ or higher linear amine, any branched amine or any cyclic aliphatic amine) such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amines, (n- and branched) dodecyl amines, (n- and branched) hexadecyl amines, (n- and branched) dodecyl amines, dimethyl amine, diethyl amine, di(n- and iso-) propyl amines, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)dodecyl amine, di(n-, iso-, t-, and the like)octadecyl amine, cyclohexyl amine, 2,3-dimethyl-1-cyclohexylamine, piperidine, pyrrolidine, and the like. Such mono-amines also encompass aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemonoamines, such as M-series Jeffamines available commercially from Huntsman Chemical Company of Austin, Tex.).; 3,3'-diamino-N-methyl-dipropylamine, and the like. In addition, in embodiments where oligeomeric species are formed, small amounts (on a molar basis) of polyamines are incorporated into the reaction mixture. A suitable amine is octadecyl amine.

Alcohols for reacting with monofunctional isocyanates to make the mixed urethane/urea resins in accordance with some embodiments of this invention include any monohydric alcohol. For instance, such monohydric alcohols are any aliphatic alcohol [e.g., a $C_1$–$C_{22}$ or higher linear alcohol, any branched alcohol or any cyclic aliphatic alcohol such as methanol, ethanol, (n- and iso-)propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like). Other suitable alcohols include N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like. Further, multifunctional alcohols can be utilized in some embodiments of the present invention. Exemplary multifunctional alcohols are ethylene glycol, diethylene glycol, triethylene glycol, dimethylolpropionic acid, sucrose, polytetramethylene glycol (MW<~3000), polypropylene glycol (MW<~3000), polyester polyols (MW<~3000), polyethylene glycol (MW<~3000), pentaerythritol, triethanol amine, glycerin, 1,6-hexanediol, N-methyl-N,N-diethanol amine, trimethylol propane, N,N,N',N'-tetrakis(2-hydroxypropyl)ethylenediamine, and the like. In some embodiments in accordance with the present invention, octadecanol is employed.

Some embodiments of the present invention encompass amines for reacting with monofunctional isocyanates to make isocyanate-derived waxes and resins. Such amines include monofunctional amines, with the exception of tertiary amines void of another nucleophilic functional groups (e.g., triethylamine). For instance, the monoamine could be any aliphatic primary or secondary amine [e.g., a $C_1$–$C_{22}$ or higher linear amine, any branched amine or any cyclic aliphatic amine such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, dimethyl amine, diethyl amine, di(n-, and iso-)propyl amine, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)octadecyl amine, di(n-, iso-, t-, and the like)dodecyl amine, cyclohexyl amine, 2,3-dimethyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like. Also, miscellaneous amines (e.g., adamantyl amine, isonipecotamide, polyoxyalkylenemono-, di-, or triamines, such as M-, D-, and T-series Jeffamines available commercially from Huntsman Chemical Company of Austin, Tex.); 3,3'-diamino-N-methyl-dipropylamine, and the like can be utilized, as well as multifunctional amines such as polyethylene imine; ethylene diamine; hexamethylene diamine; isomers of cyclohexyldiamines; 1,3-pentadiamine; 1,12-dodecanediamine; 3-dimethylamino-propylamine; 4,7,10-trioxa-1,13-tridecanediamine; diethylene triamine; 3,3-diamino-N-methyldipropylamine; tris(2-aminoethyl)amine, and the like. A preferred amine can be octadecylamine.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanolamine, diethanolamine, and the like.

Additionally, amides or other nucleophile containing compounds can be reacted with the isocyanates (mono, di, and the like). Some examples include: urea, oleamide, stearamide, or the like.

Preferred precursors to the urethane resins and urethane/urea resins of the present invention include mono-, di- and other poly-isocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenyliso-cyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylpherylisocyante; 1-naphthylisocyanate; (naphthyl)ethylisocyantes; and the like. Examples of diisocyanates include isophorone diisocyanate (IPDI); toluene diisocyanate (TDI); diphenylmethane-4,4'-diisocyanate ($M_{12}$MDI); hydrogenated diphenylmethane-4,4'-diisocyanate (HDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

Phase change inks of this invention can contain a phase change carrier system or composition. The phase change carrier composition is generally designed for use in either a direct printing mode or use in an indirect or offset printing transfer system. In the direct printing mode, the phase change carrier composition is generally made up of one or more chemicals that provide properties to allow the phase change ink (1) to be applied in a thin film of uniform thickness on the final receiving substrate when cooled to the ambient temperature after printing directly to the substrate; (2) to be ductile while retaining sufficient flexibility so that the applied image on the substrate will not fracture upon bending; and (3) to possess a high degree of lightness, chroma, transparency and thermal stability. In an offset printing transfer or indirect printing mode, the phase change carrier composition is designed to possess not only the above mentioned properties, but certain fluidic and mechanical properties, as described in U.S. Pat. No. 5,389,958. Exemplary phase change carrier composition and the inks made therefrom comprised by the current invention contain urethane resins, or urethane/urea resins. The carrier compositions can be supplemented with (one or more) additional ingredients to prepare commercial phase change carrier compositions. The urethane resins, and mixed urethane/urea resin materials of the current invention can be tailored to have the desirable properties mentioned above when used in the carrier composition of the inks of the present invention by varying one or more of the readily available commodity chemical precursors.

The phase change carrier compositions of the current invention may be used in combination with conventional phase change ink colorant materials such as Color Index (C.I.) Solvent Dyes, Disperse Dyes, modified Acid and Direct Dyes, Basic Dyes, Sulphur Dyes, Vat Dyes, and/or polymeric dyes such as those disclosed in U.S. patent application Ser. No. 08/381,610 (now U.S. Pat. No. 5,621,022), and/or pigments to produce a phase change ink. Alternatively, the phase change carrier compositions of the current invention may employ colored urethane resins or urethane/urea resins or other isocyanate-derived colored resins as described in U.S. patent application Ser. No. 08/672,617, filed Jun. 28, 1996 and assigned to the assignee of the present invention (now U.S. Pat. No. 5,780,528), to produce a phase change ink.

Phase change carrier compositions of the present invention can comprise a mono-amide. A mono-amide compound typically comprises either a primary or secondary mono-amide, but is preferably a secondary mono-amide. Of the primary mono-amides, stearamide, such as KEMAMIDE S, manufactured by Witco Chemical Company, can be employed herein. As for the secondary mono-amides, behenyl benenamide (KEMAMIDE EX-666), and stearyl stearamide (KEMAMIDE S-180), both manufactured by Witco Chemical Company, are extremely useful mono-amides. However, stearyl stearamide (KEMAMIDE S-180) is the mono-amide of choice in producing the phase change ink compositions of the present invention.

Phase change carrier compositions of the present invention can comprise at least one polyethylene wax. Preferably, the polyethylene wax has a molecular weight of about 500 to about 5,000; more preferably, of about 550 to about 2,000; and, most preferably, of about 500 to 1,000. Suitable polyethylene waxes are Polywax 655, Polywax 850, or Polywax 1000, all available from Petrolite.

Preferably, the total amount of urethane resin or resins in the phase change carrier composition and the inks made therefrom will comprise about 10% to about 40%, more preferably, about 15–35% and most preferably, about 20–30%, by weight of the carrier composition. Preferably, the total amount of mixed urethane/urea resin or resins in the phase change carrier composition will likewise comprise about 10% to about 40%, more preferably about 15–35% and most preferably, about 20–30%, by weight of the carrier composition. Preferably, the total amount of mono-amide wax and polyethylene wax combined will comprise about 40% to about 70%, more preferably, about 45–60% and most preferably about 48–57% by weight of the carrier composition.

The ratio of mono-amide wax to the polyethylene wax is preferably from about 200:1 to 9:1, by weight. More preferably, this ratio is from about 50:1 to about 12:1, by weight and, most preferably, about 25:1 to about 16:1, by weight.

Prior art phase change inks for use in direct and indirect transfer printing systems are described in U.S. Pat. Nos. 4,889,560 and 5,372,852. These inks consist of a phase change ink carrier composition comprising one or more fatty amide-containing materials, usually consisting of a mono-amide wax and a tetra-amide resin, one or more tackifiers, one or more plasticizers and one or more antioxidants, in combination with compatible colorants. A preferred tetra-amide resin is a dimer acid based tetra-amide that is the reaction product of dimer acid, ethylene diamine, and stearic acid. The typical mono-amide is stearyl stearamide. A preferred tackifier resin is a glycerol ester of hydrogenated abietic (rosin) acid and a preferred antioxidant is that provided by Uniroyal Chemical Company under the tradename Naugard 524. The urethane and urethane/urea resins employed in this invention can replace one or more of the ingredients in this prior art carrier composition or inks employing the resin components of the present invention can have all of these prior art ingredients replaced by the urethane and/or urethane/urea resins disclosed herein and/or by isocyanated derived waxes.

Among the advantages of inks formulated in accordance with the present invention relative to prior art phase change inks are:

(1) The urethane resins and mixed urethane/urea resins of this invention are very pure, being free of salts and other insoluble contaminants. This makes the inks made from these materials easy to filter and provides for high reliability in ink jet printing devices. This can be a major advantage.

(2) The urethane resins and mixed urethane/urea resins of this invention may be specifically tailored to give certain physical properties that optimize the performance of the inks of this invention in ink jet printing devices and on the output substrate. These desirable ink properties include melting point, viscosity, transparency and the dynamic mechanical properties referenced in the aforementioned U.S. Pat. No. 5,389,958.

(3) The urethane resins and mixed urethane/urea resins of this invention are used in combination with the mono-amide wax and polyethylene wax to give ink compositions that display an improved yield stress versus temperature curve over prior art ink compositions. This enables ink droplets to be spread and fused at elevated temperatures during the fusing and transfer steps in an indirect printing process, but at a lower pressure than was possible with prior art inks.

(4) The ink formulations with the added polyethylene wax disclosed herein exhibit better surface finishes in the final poured, molded and hardened ink sticks when compared to equivalent ink sticks formulated without the polyethylene wax, as well as exhibiting better release characteristics from their plastic molds. The waste ink resulting from ink sticks of the present invention also releases more easily from the waste ink trays in the printers for which they are intended for use. Finally, prints made from inks with the polyethylene wax additive also exhibit better blocking resistance at elevated temperatures.

Many other patents describe other materials for use in phase change ink jet inks. Some representative examples include U.S. Pat. Nos. 3,653,932; 4,390,369; 4,484,948; 4,684,956; 4,851,045; 5,006,170; 5,151,120; EP Application Nos. 0187352 and 0206286; and PCT Patent Application WO 94/04619. These other materials can include paraffins, microcrystalline waxes, ester waxes, amide waxes, fatty acids, fatty alcohols, fatty amides and other waxy materials, sulfonamide materials, resinous materials made from different natural sources (tall oil rosins and rosin esters are an example) and many synthetic resins, oligomers, polymers, co-polymers, and ionomers. It will be obvious to those skilled in the art that the phase change carrier composition of this invention could optionally contain any of the optional other materials.

The aforementioned U.S. Pat. No. 5,496,879 and German patent publications DE 4205636AL and DE 4205713AL, assigned to Siegwerk Farbenfabrik Keller, Dr. Rung and Co., describe materials used for phase change or hot melt gravure printing. It will be obvious to those skilled in the art that the isocyanate-derived materials of this current invention would be compatible with those materials and could also be used in that application or other similar printing methods that employ hot melt ink technology.

It also will be obvious to those skilled in the art that other ink colors besides the subtractive primary colors are desirable for applications, such as postal marking or industrial marking and labeling using phase change printing, and that this invention is applicable to these needs. Infrared (IR) or ultraviolet (UV) absorbing dyes can also be incorporated into the inks of this invention for use in applications such as "invisible" coding or marking of products.

The inks of the present invention can be equally well employed in apparatus for direct or indirect (offset) printing applications. When employed in direct printing applications a suitable method of printing or producing a layer of a phase change colored ink directly on the surface of a substrate can comprise:

(1) forming a phase change ink composition in the solid phase, comprising an admixture of (a) a phase change carrier composition containing at least one isocyanate-derived resin or wax and (b) a phase change compatible colorant.
(2) transferring the solid phase, phase change colored ink composition to a phase change ink application means or print head;
(3) raising the operating temperature of the application means or print head to a level whereby a liquid phase, phase change colored ink composition is formed;
(4) providing a substrate in proximity to the application means;
(5) applying a predetermined pattern of the liquid phase, phase change colored ink composition to at least one surface of the substrate; and
(6) lowering the temperature of the applied ink composition to form a solid phase, phase change ink pattern on the substrate.

An appropriate direct printing process is described in greater detail in U.S. Pat. No. 5,195,430.

When employed in indirect or offset printing applications a suitable method of printing or producing a layer of a phase change colored ink indirectly on the surface of a substrate by transferring from an intermediate transfer surface can comprise:

(1) forming a phase change ink composition in the solid phase, comprising an admixture of (a) a phase change carrier composition containing at least one isocyanate-derived resin or wax and (b) a phase change compatible colorant.
(2) transferring the solid phase, phase change colored ink composition to a phase change ink application means or a print head;
(3) raising the operating temperature of the application means or print head to a level whereby a liquid phase, phase change colored ink composition is formed;
(4) providing an intermediate transfer surface in proximity to the application means;
(5) applying a predetermined pattern of the liquid phase, phase change colored ink composition to the intermediate transfer surface;
(6) lowering the temperature of the applied ink composition to form a solid phase, phase change ink pattern on the intermediate transfer surface at a second, intermediate temperature;
(7) transferring said phase change ink composition from the intermediate transfer surface to a final substrate; and
(8) fixing the phase change ink composition to the substrate to form a printed substrate, the phase change ink composition having (a) a compressive yield strength which will allow it to be malleable to spread and deform without an increase in stress when compressive forces are applied thereto at the second operating temperature, and sufficient internal cohesive strength to avoid shear banding and weak behavior when said phase change ink composition is transferred and fixed to said substrate, and (b) a ductility on the substrate after fixing.

An appropriate offset or indirect printing process is described in greater detail in U.S. Pat. No. 5,389,958.

The polyethylene wax of this invention can also be employed as an overcoat layer on a printed substrate. In this application, a substrate, preferably paper, is printed with any ink, preferably with a phase change ink, more preferably with a phase change ink composition of the present invention. The printed substrate is then coated with the polyethylene wax described above. Preferably, this overcoat only coats aminority portion of the surface area of the printed substrate, more preferably a regularly spaced dot matrix covering from about 1% to about 25% of the surface area of the printed substrate.

In one example of using an overcoat, printed pages of paper are made on a Tektronix Phaser™ 340 ink jet ink printer by conventional means. The thus-produced printed paper then has a matrix of polyethylene wax dots (with about a 1% to about 5% fill) printed over the image. This wax dot matrix can be printed with another or the same ink jet printer. Preferably, the substrate after this overcoat operation is passed through a set of pressure rollers in the same ink jet printer to embed the polyethylene wax into the surface of the printed substrate. This treatment gives enhanced antiblocking properties to the prints (less transfer of ink from page to paper lying on top of output page when weighted and left standing) and also enables the prints to be fed through a copier automatic document feed (ADF) because of the decreased stickiness of the ink. Alternatively, the polyethylene wax could be applied to finished prints by other means such as an anilox roller, or could be jetted onto the transfix drum in an appropriate dot or other matrix before the rest of the image is applied to that drum, thus leaving the dot matrix of wax on top of the image after the transfix process.

The present invention is further described in detail by means of the following Examples and Comparisons. All parts and percentages are by weight and all temperatures are degrees Celsius unless explicitly stated otherwise. It is to be noted that while the following examples may recite only one colorant, it is to be understood that each individual example is only illustrative and any of the primary colorants (cyan, yellow, magenta and black) used in subtractive color printing could be employed in each instance.

A particular embodiment of the present invention is described with reference to the FIGURE as a method of forming a urethane material. Specifically, ABITOL E™ (available form Hercules) is utilized as a starting reagent. ABITOL E is shown by a representative structure, and comprises hydroabietyl alcohol (CAS[133-93-6]), methyl ester of hydrogenated rosin (CAS[8050-15-5]), and decarboxylated rosin (CAS[8050-18-8])). The ABITOL E is reacted with isophorone diisocyanate (CAS[4098-71-91]) to form a urethane product. Typically, dibutyltindilaurate (CAS [77-58-7]) is provided as a catalyst (and is provided to a concentration of less than 1% by weight relative to other reactants). The relative amount of isophorone diisocyanate to ABITOL E is preferably such that the isophorone diisocyanate is a limiting reagent in the reaction.

ABITOL E is an exemplary alcohol reagent. Such exemplary reagent is a member of a class of monohydric alcohols comprising fused rings. The fused rings may or may not comprise double bonds. The exemplary reagent is also a member of a class of alcohols comprising at least three fused rings.

The urethane product is a member of a class of materials that can be represented by formula 1.

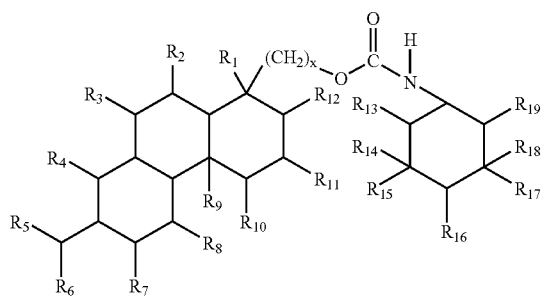

1.

The groups $R_1$–$R_{19}$ of formula 1 each comprise, independently of the others, a hydrogen atom, an alkyl group (either substituted or unsubstituted), which can be linear, branched, unsaturated, and/or cyclic, typically with from about 1 to about 100 carbon atoms, preferably with from about 12 to about 60 carbon atoms, and more preferably with from about 18 to about 50 carbon atoms, although the number of carbon atoms can be outside of these ranges, an aryl group (either substituted or unsubstituted), typically with from about 6 to about 24 carbon atoms, preferably with from about 6 to about 14 carbon atoms, and more preferably with from about 6 to about 10 carbon atoms, although the number of carbon atoms can be outside of these ranges, an arylalkyl group or alkylaryl group (either substituted or unsubstituted), typically with from about 7 to about 100 carbon atoms, preferably with from about 10 to about 60 carbon atoms, and more preferably with from about 18 to about 50 carbon atoms, although the number of carbon atoms can be outside of these ranges, a heterocyclic group (either substituted or unsubstituted), typically with from about 3 to about 50 carbon atoms, preferably with from about 3 to about 18 carbon atoms, and more preferably with from about 3 to about 12 carbon atoms, although the number of carbon atoms can be outside of these ranges, wherein the hetero atom or atoms can be, but are not limited to, atoms such as oxygen, nitrogen, sulfur, phosphorus, silicon, and the like, as well as mixtures thereof, wherein two or more of the R groups can be joined together to form a ring, and where the substituents on the substituted alkyl, aryl, arylalkyl, alkylaryl, and heterocyclic groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups; acid anhydride groups, azide groups, mixtures thereof, and the like, wherein any two or more substituents can be joined together to form a ring. Further one or more of groups $R_1$–$R_{19}$ can be comprised by a ring structure. The segment $(CH_2)_X$ comprises one or more methylene groups.

A more specific description of a class encompassing the urethane product of the FIGURE is shown below as formula 2.

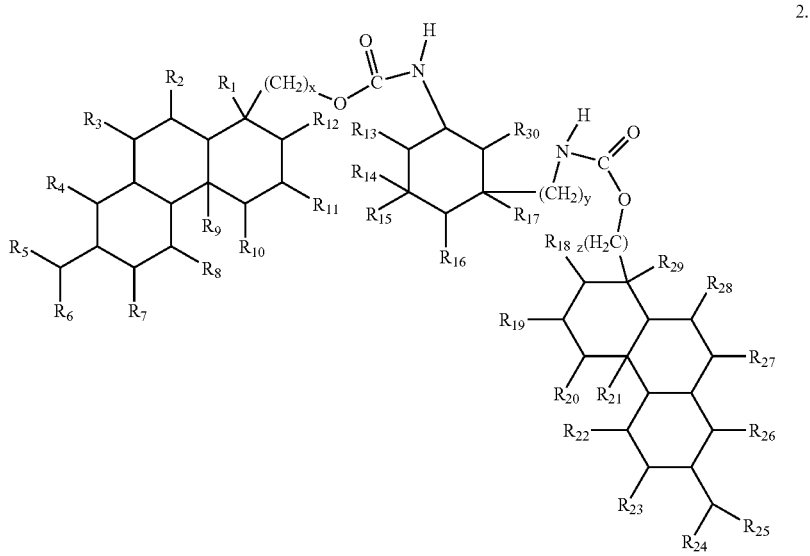

2.

The groups $R_1$–$R_{30}$ of formula 2 comprise, independently of the others, a hydrogen atom, an alkyl group (either substituted or unsubstituted), which can be linear, branched, unsaturated, and/or cyclic, typically with from about 1 to about 100 carbon atoms, preferably with from about 12 to about 60 carbon atoms, and more preferably with from about 18 to about 50 carbon atoms, although the number of carbon atoms can be outside of these ranges, an aryl group (either substituted or unsubstituted), typically with from about 6 to about 24 carbon atoms, preferably with from about 6 to about 14 carbon atoms, and more preferably with from about 6 to about 10 carbon atoms, although the number of carbon atoms can be outside of these ranges, an arylalkyl group or alkylaryl group (either substituted or unsubstituted), typically with from about 7 to about 100 carbon atoms, preferably with from about 10 to about 60 carbon atoms, and more preferably with from about 18 to about 50 carbon atoms, although the number of carbon atoms can be outside of these ranges, a heterocyclic group (either substituted or unsubstituted), typically with from about 3 to about 50 carbon atoms, preferably with from about 3 to about 18 carbon atoms, and more preferably with from about 3 to about 12 carbon atoms, although the number of carbon atoms can be outside of these ranges, wherein the hetero atom or atoms can be, but are not limited to, atoms such as oxygen, nitrogen, sulfur, phosphorus, silicon, and the like, as well as mixtures thereof, wherein two or more of the R groups can be joined together to form a ring, and where the substituents on the substituted alkyl, aryl, arylalkyl, alkylaryl, and heterocyclic groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, mixtures thereof, and the like, wherein any two or more substituents can be joined together to form a ring. The segments $(CH_2)_X$, $(CH_2)_Y$, and $(CH_2)_Z$ comprise one or more methylene groups and can be the same as one another or different from one another.

A yet more specific description of a class encompassing the urethane product of the FIGURE is shown below as formula 3.

carbon atoms, and more preferably with from about 18 to about 50 carbon atoms, although the number of carbon atoms can be outside of these ranges, a heterocyclic group (either substituted or unsubstituted), typically with from about 3 to about 50 carbon atoms, preferably with from about 3 to about 18 carbon atoms, and more preferably with from about 3 to about 12 carbon atoms, although the number of carbon atoms can be outside of these ranges, wherein the hetero atom or atoms can be, but are not limited to, atoms such as oxygen, nitrogen, sulfur, phosphorus, silicon, and the like, as well as mixtures thereof, wherein two or more of the R groups can be joined together to form a ring, and where the substituents on the substituted alkyl, aryl, arylalkyl, alkylaryl, and heterocyclic groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, mixtures thereof, and the like, wherein any two or more substituents can be joined together to form a ring hydrogen, alkyl groups or aryl groups.

The urethane product of the FIGURE (or any members of the urethane products encompassed by formulas 1–3), can

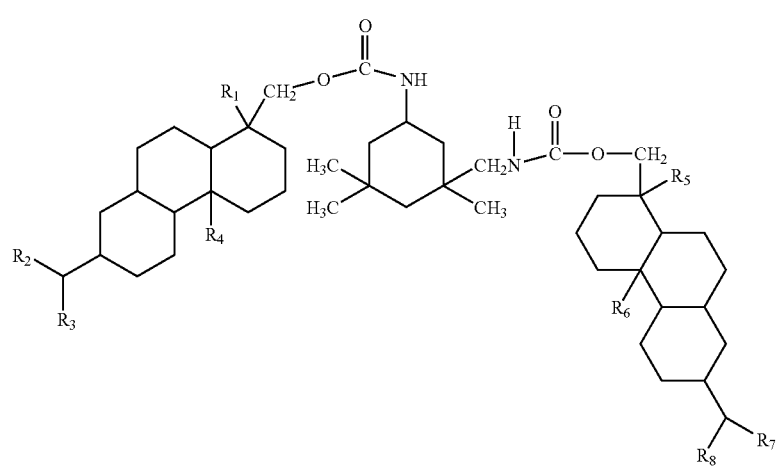

3.

The groups $R_1$, $R_2$, $R_3$, $R_4$, $R_5$, $R_6$, $R_7$ and $R_8$ of formula 3 comprise, independently of the others, a hydrogen atom, an alkyl group (either substituted or unsubstituted), which can be linear, branched, unsaturated, and/or cyclic, typically with from about 1 to about 100 carbon atoms, preferably with from about 12 to about 60 carbon atoms, and more preferably with from about 18 to about 50 carbon atoms, although the number of carbon atoms can be outside of these ranges, an aryl group (either substituted or unsubstituted), typically with from about 6 to about 24 carbon atoms, preferably with from about 6 to about 14 carbon atoms, and more preferably with from about 6 to about 10 carbon atoms, although the number of carbon atoms can be outside of these ranges, an arylalkyl group or alkylaryl group (either substituted or unsubstituted), typically with from about 7 to about 100 carbon atoms, preferably with from about 10 to about 60 be incorporated into phase change inks. For instance, such urethane products can be combined with polyethylene waxes and/or mono-amide compounds to form phase change ink carrier compositions. Phase change inks comprising the urethane products can be printed by, for example, either the direct or offset printing methodologies described previously.

EXAMPLE 1

The Reaction Product of Octyphenol Ethoxylate, Isophorone Diisocyanate and Yellow Reactive Colorant About 525.0 grams (4.73 equiv.) of isophorone diisocyanate[1] and 1.5 grams of dibutyltindilaurate[2] catalyst, followed by 986 grams (3.88 equiv.) of octylphenol ethoxylate³, were added to a 3000 ml three-neck resin kettle equipped with a Trubore stirrer, $N_2$ atmosphere inlet, and a thermocouple-temperature controller. The reaction mixture was heated to about 135° C., about 346.1 grams (0.497 equiv.) of a yellow polymeric colorant corresponding to a Colorant A from Table I of U.S. Pat. No. 5,231,135 were added and the reaction mixture was heated for approximately 2 hours. An additional about 110.0 grams (0.433 equiv.) of octylphenol ethoxylate³ were added and the reaction mixture was heated at about 150° C. for approximately 2 hours. An FT-IR of the product was obtained to insure all of the isocyanate (NCO) functionality was consumed. The absence (disappearance) of a peak at about 2285 cm$^{-1}$ (NCO) and the appearance (or increase in magnitude) of peaks at about 1740–1680 cm$^{-1}$ and about 1540–1530 cm$^{-1}$ corresponding to urethane frequencies were used to confirm this. The diurethane reaction product was poured into aluminum molds and allowed to cool and harden. This final colored resin product was characterized by the following physical properties: viscosity of about 121 cPs as measured by a Ferranti-Shirley cone-plate viscometer at about 140° C., a melting point of about 38° C. to about 115° C. as measured by electrothermal capillary melting point apparatus, a $T_g$ of about 12.4° C. as measured by differential scanning calorimetry using a DuPont 2100 calorimeter at a scan rate of 20° C./minute, and a spectral strength of about 5634 milliliters Absorbance Units per gram at λ max as measured by dilution in n-butanol using a Perkin Elmer Lambda 2S UV/VIS spectrophotometer.

[1] Desmodur I B Isophorone diisocyanate available from Bayer Corp. of Pittsburgh, Pa.

[2] Dibutyltindilaurate available from Aldrich Chemicals of Milwaukee, Wis.

[3] IGEPAL CA-210 octylphenol ethoxylate is available from Rhone-Poulenc Co., Cranbury, N.J.

EXAMPLE 2

The Reaction Product of 1.5 Parts Hydroabietyl Alcohol, 0.5 Parts Octadecyl Amine, and Isophorone Diisocyanate About 240.2 grams (0.676 moles) of hydroabietyl alcohol⁴ was added to a 1000 ml four-neck resin kettle equipped with a Trubore stirrer, an $N_2$ atmosphere inlet, 200 ml addition funnel, and a thermocouple temperature controller. About 100.0 grams (0.45 moles) of isophorone diisocyanate⁵ was added to the addition funnel. Agitation of the hydroabietyl alcohol first was begun and then all of the isophorone diisocyanate was added over approximately 5 minutes. About 0.22 grams of dibutyltindilaurate⁶ catalyst was added and the reaction mixture heated to about 125° C. under an $N_2$ atmosphere. After 4 hours at 125° C., about 59.95 grams (0.225 moles) of octadecyl amine⁷ was added and the temperature raised to about 150° C. and held for approximately 2 hours. An FT-IR of the reaction product was run to insure all of the NCO functionality was consumed. The absence (disappearance) of a peak at about 2285 cm$^{-1}$ (NCO) and the appearance (or increase in magnitude) of peaks at about 1705–1635 cm$^{-1}$ and about 1515–1555 cm$^{-1}$ corresponding to urea frequencies and about 1740–1680 cm$^{-1}$ and about 1540–1530 cm$^{-1}$ corresponding to urethane frequencies were used to confirm this. The final mixed urethane/urea resin product was poured into aluminum molds and allowed to cool and harden. This final product was a clear solid resin at room temperature characterized by the following physical properties: viscosity of about 314.8 cPs as measured by a Ferranti-Shirley cone-plate viscometer at about 140° C., a melting point of from about 67.9° C. to about 87.0° C. as measured by an electrothermal capillary melting point apparatus, and a $T_g$ of about 23° C. as measured by differential scanning calorimetry using a DuPont 2100 calorimeter at a scan rate of 20° C./minute.

[4] Arbitol E B Hydroabietyl alcohol available from Hercules Inc. of Wilmington, Del.

[5] Desmodur I B Isophorone diisocyanate available from Bayer Corp. of Pittsburgh, Pa.

[6] Dibutyltindilaurate available from Aldrich Chemicals of Milwaukee, Wis.

[7] Octadecyl amine (technical grade) available from ACROS Organics of New Jersey.

EXAMPLE 3

The Reaction Product of Octyphenol Ethoxylate, Isophorone Diisocyanate and Cyan Reactive Colorant About 525.0 grams (4.73 equiv.) of isophorone diisocyanate⁸, about 1.5 grams of dibutyltindilaurate⁹ catalyst, and about 992.0 grams (3.91 equiv.) of octylphenol ethoxylate¹⁰ were added to a 3000 ml three-neck resin kettle equipped with a Trubore stirrer, a $N_2$ atmosphere inlet, and a thermocouple-temperature controller. The reaction mixture was heated to about 135° C. and held for approximately 3.5 hours with stirring under nitrogen. About 240.6 grams (0.473 equiv.) of a cyan polymeric colorant¹¹ were then added and the mixture was heated at about 150° C. for approximately 2 hours. An FT-IR of the product was obtained to insure all of the isocyanate (NCO) functionality was consumed. The absence (disappearance) of a peak at about 2285 cm$^{-1}$ (NCO) and the appearance (or increase in magnitude) of peaks at about 1740–1680 cm$^{-1}$ and about 1540–1530 cm$^{-1}$ corresponding to urethane frequencies were used to confirm this. The diurethane reaction product was poured into aluminum molds and allowed to cool and harden. This final colored resin product was characterized by the following physical properties: viscosity of about 181.8 cPs as measured by a Ferranti-Shirley cone-plate viscometer at about 140° C., a melting point of about 59.9–70.2° C. as measured by electrothermal capillary melting point apparatus, and a $T_g$ of about 23.1° C. as measured by differential scanning calorimetry using a DuPont 2100 calorimeter at a scan rate of 20° C./minute, and a spectral strength of about 5588 milliliters Absorbance Units per gram at λ max as measured by dilution in n-butanol using a Perking Elmer Lambda 2S UV/VIS spectrophotometer.

[8] Desmodur I B Isophorone diisocyanate available from Bayer Corp. of Pittsburgh, Pa.

[9] Dibutyltindilaurate available from Aldrich Chemicals of Milwaukee, Wis.

[10] IGEPAL CA-210 octylphenol ethoxylate is available from Rhone-Poulenc Co., Cranbury, N.J.

[11] Experimental Blue III 9495-28 available from Milliken and Company of Spartanburg, S.C.

EXAMPLE 4

The Reaction Product of Octylphenol Ethoxylate, Isophorone Diisocyanate and Blended Black Reactive Colorants About 150.0 grams (0.295 equiv.) of a cyan polymeric reactive colorant¹², about 225.0 grams (0.147 equiv.) of a violet polymeric colorant corresponding to Colorant U from Table I of U.S. Pat. No. 5,231,135; about 345.0 (0.552 equiv.) of an orange polymeric reactive colorant corresponding to Colorant B from Table I of U.S. Pat. No. 5,231,135; about 450.0 grams (4.054 equiv.) of isophorone diisocyanate[13] and about 0.18 grams of dibutyltindilaurate catalyst[14] were added to a 3000 ml three-neck resin kettle equipped with a Trubore stirrer, a $N_2$ atmosphere inlet, and a thermocouple-temperature controller. The reaction mixture was heated to about 90° C. with stirring under nitrogen. After 3.5 hours at about 90° C., about 1.0 grams of additional dibutyltindilaurate catalyst[14] and about 805.0 grams (3.012 equiv.) of octylphenol ethoxylate[15] were added and the temperature was raised to about 130° C. and held for approximately 3.5 hours. An FT-IR of the product was obtained to insure that all of the isocyanate (NCO) functionality was consumed. The absence (disappearance) of a peak at about 2285 $cm^{-1}$ (NCO) and the appearance (or increase in magnitude) of peaks at about 1740–1680 $cm^{-1}$ and about 1540–1530 $cm^{-1}$ corresponding to urethane frequencies were used to confirm this. The diurethane reaction product was poured into aluminum molds and allowed to cool and harden. This final colored resin product was characterized by the following physical properties: viscosity of about 163.0 cPs as measured by a Ferranti-Shirley cone-plate viscometer at about 140° C., a melting point of below ambient temperature and not measurable by electrothermal melting pint apparatus, a $T_g$ of about 3.8° C. as measured by differential scanning calorimetry using a DuPont 2100 calorimeter at a scan rate of 20° C./minute, and a spectral strength of about 4667 milliliters Absorbance Units per gram at λ max as measured by dilution in n-butanol using a Perkin Elmer Lambda 2S UV/VIS spectrophotometer.

[12] Experimental Blue III 9495-28 available from Milliken and Company of Spartanburg, S.C.

[13] Desmodur I B Isophorone diisocyanate available from Bayer Corp. of Pittsburgh, Pa.

[14] Dibutyltindilaurate available from Aldrich Chemicals of Milwaukee, Wis.

[15] IGEPAL CA-210 octylphenol ethoxylate is available from Rhone-Poulenc Co., Cranbury, N.J.

EXAMPLE 5

Cyan Ink Made from Amide Wax Polyethylene Wax, Mixed Urethane/Urea Resin and Cyan Colored Urethane Resin In a stainless steel beaker were combined about 237.5 grams of the cyan colored resin from Example 3, about 237.5 grams of the reaction product urethane/urea mixture material from Example 2 above, about 473 grams of Witco S-180 stearyl stearamide[16], about 50 grams of polyethylene wax[17] and about 2 grams of Uniroyal Naugard 445 antioxidant[18]. The materials were melted together at a temperature of about 125° C. in an oven, then blended by stirring in a temperature controlled mantle at about 125° C. for about one hour. After stirring for about one hour, the cyan ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.7 cPs as measured by a Ferranti-Shirley cone-plate viscometer at about 140° C., a melting point of about 89° C. as measured by differential scanning calorimetry using a DuPont 2100 calorimeter, and a $T_g$ of about 21.9° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1469 milliliters Absorbance Units per gram at λ max.

[16] Kemamide S-180 B Stearyl stearamide available from Witco Chemical Company of Memphis, Tenn.

[17] Polywax 850 B Polyethylene wax available from Petrolite Chemical of Tulsa, Okla.

[18] Naugard 445 B antioxidant available from Uniroyal Chemical Company of Oxford, Conn.

EXAMPLE 6

Yellow Ink Made from Amide Wax, Polyethylene Wax, Mixed Urethane/Urea Resin and Yellow Colored Urethane Resin In a stainless steel beaker were combined about 264 grams of the colored resin from Example 1 above, about 225.7 grams of the material from Example 2 above, about 458 grams of Witco S-180 stearyl stearamide[19], about 50 grams of polyethylene wax[20] and about 2.0 grams of Uniroyal Naugard 445 antioxidant[21]. The materials were melted together at a temperature of about 125° C. in an oven, then blended by stirring in a temperature controlled mantle at about 125° C. for about one hour. The yellow ink was then filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.7 cPs as measured by a Ferranti-Shirley cone-plate viscometer at about 140° C., a melting point of about 90° C. as measured by differential scanning calorimetry using a DuPont 2100 calorimeter, and a $T_g$ of about 20° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1529 milliliters Absorbance Units per gram at λ max.

[19] Kemamide S-180 B Stearyl stearamide available from Witco Chemical Company of Memphis, Tenn.

[20] Polywax 850 B Polyethylene wax available from Petrolite Chemical of Tulsa, Okla.

[21] Naugard 445 B antioxidant available from Uniroyal Chemical Company of Oxford, Conn.

EXAMPLE 7

Black Ink Made from Amide Wax, Polyethylene Wax Mixed Urethane/Urea Resin and Black Colored Urethane Resin In a stainless steel beaker were combined about 220 grams of the colored urethane resin from Example 4 above, about 220 grams of the reaction product urethane/urea mixture material from Example 2 above, about 508 grams of Witco S-180 stearyl stearamide[22], about 50 grams of polyethylene wax[23] and about 2.0 grams of Uniroyal Naugard 445 antioxidant[24]. The materials were melted together at a temperature of about 125° C. in an oven, then blended by stirring in a temperature controlled mantle at about 125° C. for about one hour. The black ink was then filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.9 cPs as measured by a Ferranti-Shirley cone-plate viscometer at about 140° C., a melting point of about 89° C. as measured by differential scanning calorimetry using a DuPont 2100 calorimeter, and a $T_g$ of about 16° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1434 milliliters Absorbance Units per gram at λ max.

[22] Kemamide S-180 B Stearyl stearamide available from Witco Chemical Company of Memphis, Tenn.

[23] Polywax 850 B Polyethylene wax available from Petrolite Chemical of Tulsa, Okla.

[24] Naugard 445 B antioxidant available from Uniroyal Chemical Company of Oxford, Conn.

PRINT AND PERFORMANCE TESTING

The inks in Examples 5, 6, and 7 were tested in a Tektronix Phaser™ 340 printer, which uses an offset transfer printing system. All of the above inks were found to completely transfer and to give images of good color, print quality and durability either as primary colors or when used in combination with each other or the commercially available Phaser™ 340 printer inks.

The inks of Examples 5, 6 and 7 were poured into molded HIPSMA (High Impact Polystyrene/Maleic Anhydride) plastic cups or tubs and allowed to cool and solidify. The finished solid ink sticks from these examples had markedly better surface finishes and better release properties from the plastic cups when compared to comparable formulations without the polyethylene wax additive.

Prints made from these examples showed better blocking resistance at high temperatures when compared to comparable formulations without the polyethylene wax additives. The blocking test used is described on page 56 of the Proceedings of NIP12: The Twelfth International Congress on Digital Printing Technologies, published in 1996 by the Society for Imaging Science and Technology.

EXAMPLE 8

About 500 grams of Petrolite PE850 wax was filtered in a Mott apparatus using Whatman #3 paper. The filtration was done at about 125° C. and 15 psi. The filtered polyethylene wax was poured into aluminum ink molds and allowed to harden in the shape of Phaser™ 300 ink sticks. The wax sticks were placed in the ink reservoir of a Tektronix Phaser™ 300 printer. This printer was used to print a matrix of PE wax dots over the top of images previously made using a Phaser™ 340 printer. The matrix varied from about 1% area coverage to about 20% area coverage. It was found that a matrix of about 5% coverage of wax dots was a good compromise between placing a minimum amount of wax over the image and obtaining good document feeding performance in a photocopier. This overprinting method was effective to enhance the document-feeding performance of prints made with commercial Phaser™ 340 inks, as well as the inks from the aforementioned U.S. patent application Ser. No. 08/672,815 (now U.S. Pat. No. 5,830,942), when the output sheets were fed through the automatic document feeder of a number of different model photocopiers, including models made by Xerox, Canon and Minolta.

EXAMPLE 9

Cyan Ink Made from Polyethylene Wax and Compatible Amide Resin

In a stainless steel beaker were combined about 89 grams of the material from Example 1 of U.S. Pat. No. 5,750,604, about 170 grams of the material from Example 1 of U.S. application Ser. No. 09/354,237, and about 496 grams of Polywax PE655[25]. The materials were melted together at a temperature of about 135° C. in an oven, then blended by stirring in a temperature controlled mantle for ½ hour at 135° C. At that time about 44 grams of a cyan wax from Example 4 of U.S. Pat. No. 5,919,839 were added along with about 2 grams of an antioxidant[26] and the mixture was stirred for an additional two hours. After the ink had mixed, 10 grams of Hyflo Supercel filter aid (available from Fluka Chemical) was added and stirred into the molten ink for five minutes. The ink was then filtered through heated (135° C.) Mott apparatus (available from Mott Mettalurgical) using Whatman #3 filter paper at 5 psi. The filtered ink was poured into molds and allowed to solidify to form ink sticks. The viscosity of the finished cyan ink was about 12.0 cPs at 135° C. as measured by a Rheometric Scientific RS-2000 cone-plate viscometer. The spectral strength of about 1460 ml*A/g in butanol solution was determined on a Perkin-Elmer Lambda 2S spectrophotometer. The melting point of about 100° C. was measured by differential scanning calorimetry using a DuPont 2100 calorimeter. The Tg of about 9° C. was measured by dynamic mechanical analysis using a Rheometric Scientific RSA II Solids Analyzer. This ink was placed in a prototype Phaser™ 840 printer which uses an indirect printing process. The ink was printed using a print head temperature of about 135° C. The finished prints were found to have a good color, durability and image quality.

[25] Polywax PE655—Polyethylene wax available from Baker Petrolite Co. of Tulsa, Okla.

[26] Naugard 445—antioxidant available from Uniroyal Chemical Company, Inc. of Middlebury, Conn. 06749.

EXAMPLE 10

Magenta Ink Made from Polyethylene Wax and Compatible Amide Resin

In a stainless steel beaker were combined about 93 grams of the material from Example 1 of U.S. Pat. No. 5,750,604, about 39 grams of the material from Example 4 of U.S. application Ser. No. 09/400,127, about 185 grams of the material from Example 1 of U.S. application Ser. No. 09/354,237, about 343 grams of Polywax PE655[27] and about 130 grams of stearyl stearamide[28]. In addition, 1.68 grams of an antioxidant[29] was added to the mixture. The materials were melted together at a temperature of about 135° C. in an oven, then blended by stirring in a temperature controlled mantle for ½ hour at 135° C. At that time 4.0 grams of Neptun Red Base NB[30], 4.0 grams of Keyplast Magenta RB[31] and 2.0 grams of Bio-Soft S-100[32] were added to the mixture and the mixture was stirred for an additional two hours. After the ink had mixed, 10 grams of Hyflo Supercel filter aid (available from Fluka Chemical) was added and stirred into the molten ink for five minutes. The ink was then filtered through a heated (135° C.) Mott apparatus (available from Mott Mettalurgical) using Whatman #3 filter paper at 5 psi. The filtered ink was poured into molds and allowed to solidify to form ink sticks. The viscosity of the finished cyan ink was about 11.7 cPs at 135° C. as measured by a Rheometric Scientific RS-2000 cone-plate viscometer. The spectral strength of about 880 ml*A/g in butanol solution was determined on a Perkin-Elmer Lambda 2S spectrophotometer. The melting point of about 103° C. was measured by differential scanning calorimetry using a DuPont 2100 calorimeter. The Tg of about 10° C. was measured by dynamic mechanical analysis using a Rheometric Scientific RSA II Solids Analyzer. This ink was placed in a prototype Phaser™ 840 printer which uses an indirect printing process. The ink was printed using a print head temperature of about 135° C. The finished prints were found to have a good color, durability and image quality. Print and Performance Testing

[27] Polywax PE655—Polyethylene wax available from Baker Petrolite Co. of Tulsa, Okla.

[28] Kemamide S-180—stearyl stearamide available from Witco of Memphis, Tenn. 38108.

[29] Naugard 445—antioxidant available from Uniroyal Chemical Co., Inc. of Middlebury, Conn. 06749.

[30] Neptun Red Base NB 543—a solvent soluble dye available from BASF Corp. of Renesselear, N.Y.

[31] Keyplast Magenta RB–a solvent soluble dye available from Keystone Aniline Corp. of Chicago, Ill. 60093.

[32] Bio-Soft S-100—dodeclybenzenesulfonic acid available from Stepan Co. of Northfield, Ill. 60093.

EXAMPLE 11

Yellow Ink Made from Polyethylene Wax and Compatible Amide Resin

In a stainless steel beaker were combined about 94 grams of the material from Example 1 of U.S. Pat. No. 5,750,604, about 40 grams of the material from Example 4 of U.S. application Ser. No. 09/400,127, about 141 grams of the material from Example 1 of U.S. application Ser. No. 09/354,237, and about 434 grams of Polywax PE655[33]. In addition about 40 grams of stearyl stearamide[34] and about 2 grams of an antioxidant[35], were added to the mixture. The materials were melted together at a temperature of about 135° C. in an oven, then blended by stirring in a temperature controlled mantle for ½ hour at 135° C. At that time about 45 grams of the yellow wax from Example 1 of U.S. Pat. No. 5,919,839 and about 5 grams of a yellow dye[36] were added to the mixture and the mixture was stirred for an additional two hours. After the ink had mixed, 10 grams of Hyflo Supercel filter aid (available from Fluka Chemical) was added and stirred into the molten ink for five minutes. The ink was then filtered through a heated (135° C.) Mott apparatus (available from Mott Mettalurgical) using Whatman #3 filter paper at 5 psi. The filtered ink was poured into molds and allowed to solidify to form ink sticks. The viscosity of the finished yellow ink was about 12.0 cPs at 135° C. as measured by a Rheometric Scientific RS-2000 cone-plate viscometer. The spectral strength of about 1304 ml*A/g in butanol solution was determined on a Perkin-Elmer Lambda 2S spectrophotometer. The melting point of about 101° C. was measured by differential scanning calorimetry using a DuPont 2100 calorimeter. The Tg of about 12° C. was measured by dynamic mechanical analysis using a Rheometric Scientific RSA II Solids Analyzer. This ink was placed in a prototype Phaser™ 840 printer which uses an indirect printing process. The ink was printed using a print head temperature of about 135° C. The finished prints were found to have good color, durability and image quality.

[33] Polywax PE655—Polyethylene wax available from Baker Petrolite Co. of Tulsa, Okla.

[34] Kemamide S-180—stearyl stearamide available from Witco of Memphis, Tenn. 38108.

[35] Naugard 445—antioxidant available from Uniroyal Chemical Co., Inc. of Middlebury, Conn. 06749.

[36] Orasol Yellow 2GLN—a solvent soluble dye available from Ciba Specialty Chemicals of Newport, Del. 19804-2490.

EXAMPLE 12

Black Ink Made from Polyethylene Wax and Compatible Amide Resin

In a stainless steel beaker were combined about 78 grams of the material from Example 1 of U.S. Pat. No. 5,750,604, about 26 grams of the material from Example 4 of U.S. application Ser. No. 09/400,127, about 152 grams of the material from Example 1 of U.S. application Ser. No. 09/354,237, and about 401 grams of Polywax PE655[37]. In addition about 91 grams of stearyl stearamide[38], about 27 grams of a plasticizer[39] and about 2 grams of an antioxidant[40] were added to the mixture. The materials were melted together at a temperature of about 135° C. in an oven, then blended by stirring in a temperature controlled mantle for ½ hour at 135° C. At that time 24 grams of a Savinyl Black NS[41] was added to the mixture and the mixture was stirred for an additional two hours. After the ink had mixed, 10 grams of Hyflo Supercel filter aid (available from Fluka Chemical) was added and stirred into the molten ink for five minutes. The ink was then filtered through a heated (135° C.) Mott apparatus (available from Mott Mettalurgical) using Whatman #3 filter paper at 5 psi. The filtered ink was poured into molds and allowed to solidify to form ink sticks. The viscosity of the finished black ink was about 11.5 cPs at 135° C. as measured by a Rheometric Scientific RS-2000 cone-plate viscometer. The spectral strength of about 785 ml*A/g in butanol solution was determined in a Perkin-Elmer Lambda 2S spectrophotometer. The melting point of about 101° C. was measured by differential scanning calorimetry using a DuPont 2100 calorimeter. The Tg of about 7° C. was measured by dynamic mechanical analysis using a Rheometric Scientific RSA II Solids Analyzer. This ink was placed in a prototype Phaser™ 840 printer which uses an indirect printing process. The ink was printed using a print head temperature of about 135° C. The finished prints were found to have a good color, durability and image quality.

[37] Polywax PE655—Polyethylene wax available from Baker Petrolite Co. of Tulsa, Okla.

[38] Kemamide S-180—stearyl stearamide available from Witco of Memphis, Tenn. 38108.

[39] Santicizer 278—plasticizer available from Solutia (formerly Monsanto Co. of St. Louis, Mo. 63167).

[40] Naugard 445—antioxidant available from Uniroyal Chemical Co., Inc. of Middlebury, Conn. 06749.

[41] Savinyl Black NS—solvent soluble black dye available from Clariant Corp. of Coventry, R.I. 02816.

EXAMPLE 13

The Reaction Product of Hydroabietyl Alcohol and Isophorone Diisocyanate

About 391.9 grams (1.351 moles) of Abitol E hydroabietyl alcohol[42] was added to a 1000 ml four-neck resin kettle equipped with a Trubore stirrer, an $N_2$ atmosphere inlet, 200 ml addition funnel, and a thermocouple-temperature controller. The kettle was heated to about 100° C. with stirring under an $N_2$ atmosphere and about 150.0 grams (0.676 moles) of isophorone diiso-cyanate[43] was added to the addition funnel. About 0.50 grams of dibutyltindilaurate[44] catalyst was added to the Abitol E, followed by dropwise addition of the isophorone diisocyanate over 3 hours. The temperature was gradually increased to about 155° C. during this 3 hour period. After an additional 2 hours at about 155° C., a Fourier Transform Infrared Spectroscopy (FT-IR) of the product was run to insure all of the isocyanate (NCO) was consumed. The absence (disappearance) of a peak at about 2285 $cm^{-1}$ (NCO) and the appearance (or increase in magnitude) of peaks at about 1740–1680 $cm^{-1}$ and about 1540–1530 $cm^{-1}$ corresponding to urethane frequencies were used to confirm this. The final di-urethane resin product was poured into aluminum molds and allowed to cool and harden. This final product was a clear solid resin at room temperature characterized by the following physical properties: viscosity of about 4,072.9 cPs as measured by a Ferranti-Shirley cone-plate viscometer at about 140° C., a melting point of from about 72.0° C. to about 76.0° C. as measured by an electrothermal capillary melting point apparatus, and a $T_g$ of about 48° C. as measured by differential scanning calorimetry using a DuPont 2100 calorimeter at a scan rate of 20° C./minute.

[42] Abitol E—Hydroabietyl alcohol available from Hercules Inc. of Wilmington, Del.
[43] Desmodur I—Isophorone Diisocyanate available from Bayer Corp. of Pittsburg, Pa.
[44] Dibutyltindilaurate available from Aldrich Chemicals of Milwaukee, Wis.

EXAMPLE 14

The Reaction Product of 1.5 Parts Hydroabietyl Alcohol, 0.5 Parts Octadecyl Amine, and Isophorone Diisocyanate About 240.2 grams (0.676 moles) of hydroabietyl alcohol[45] was added to a 1000 ml four-neck resin kettle equipped with a Trubore stirrer, an $N_2$ atmosphere inlet, 200 ml addition funnel, and a thermocouple-temperature controller. About 100.0 grams (0.45 moles) of isophorone diisocyanate[46] was added to the addition funnel. Agitation of the hydroabietyl alcohol first was begun and then all of the isophorone diisocyanate was added over approximately 5 minutes. About 0.22 grams of dibutyltindilaurate[47] catalyst was added and the reaction mixture heated to about 125° C. under an $N_2$ atmosphere. After 4 hours at 125° C., about 59.95 grams (0.225 moles) of octadecyl amine[48] was added and the temperature raised to about 150° C. and held for approximately 2 hours. An FT-IR of the reaction product was run to insure all of the NCO functionality was consumed. The absence (disappearance) of a peak at about 2285 $cm^{-1}$ (NCO) and the appearance (or increase in magnitude) of peaks at about 1705–1635 $cm^{-1}$ and about 1515–1555 $cm^{-1}$ corresponding to urea frequencies and about 1740–1680 $cm^{-1}$ and about 1540–1530 $cm^{-1}$ corresponding to urethane frequencies were used to confirm this. The final mixed urethane/urea resin product was poured into aluminum molds and allowed to cool and harden. This final product was a clear solid resin at room temperature characterized by the following physical properties: viscosity of about 314.8 cPs as measured by a Ferranti-Shirley cone-plate viscometer at about 140° C., a melting point of from about 67.9° C. to about 87.0° C. as measured by an electrothermal capillary melting point apparatus, and a $T_g$ of about 23° C. as measured by differential scanning calorimetry using a DuPont 2100 calorimeter at a scan rate of 20° C./minute.

[45] Abitol E—Hydroabietyl alcohol available from Hercules Inc. of Wilmington, Del.
[46] Desmodur I—Isophorone diisocyanate available from Bayer Corp. of Pittsburg, Pa.
[47] Dibutyltindilaurate available from Aldrich Chemicals of Milwaukee, Wis.
[48] Octadecyl amine (technical grade) available from ACROS Organics of New Jersey.

EXAMPLE 15

The Reaction Product of 1.25 Parts Hydroabietyl Alcohol 0.75 Parts Octadecyl Amine and Isophorone Diisocyanate About 150.1 grams (0.422 moles) of hydroabietyl alcohol[49] and about 75.0 grams (0.338 moles) of isophorone diisocyanate[50] were added to a 500 ml three-neck resin kettle equipped with a Trubore stirrer, an $N_2$ atmosphere inlet, and a thermocouple-temperature controller. Agitation was begun and then about 0.22 grams of dibutyltindilaurate[51] catalyst was added and the reaction mixture heated to about 130° C. under an $N_2$ atmosphere. After 4 hours at about 130° C., about 67.45 grams (0.253 moles) of octadecyl amine[52] was added and the temperature raised to about 150° C. and held for approximately 2 hours. An FT-IR of the reaction product was run to insure all of the NCO functionality consumed. The absence (disappearance) of a peak at about 2285 $cm^{-1}$(NCO) and the appearance (or increase in magnitude) of peaks at about 1705–1635 $cm^{-1}$ and about 1515–1555 $cm^{-1}$ corresponding to urea frequencies and about 1740–1680 $cm^{-1}$ and about 1540–1530 $cm^{-1}$ corresponding to urethane frequencies were used to confirm this. The final mixed urethane/urea resin product was then poured into aluminum molds and allowed to cool and harden. This final product was a clear solid resin at room temperature characterized by the following physical properties: viscosity of about 275.0 cPs as measured by a Ferranti-Shirley cone-plate viscometer at about 140° C., a melting point of from about 68.4° C. to about 89.0° C. as measured by an electrothermal capillary melting point apparatus, and a $T_g$ of about 17° C. as measured by differential scanning calorimetry using a DuPont 2100 calorimeter at a scan rate of 20° C./minute.

[49] Abitol E—Hydroabietyl alcohol available from Hercules Inc. of Wilmington, Del.
[50] Desmodur I—Isophorone diisocyanate available from Bayer Corp. of Pittsburg, Pa.
[51] Dibutyltindilaurate available from Aldrich Chemicals of Milwaukee, Wis.
[52] Octadecyl amine (technical grade) available from ACROS Organics of New Jersey.

EXAMPLE 16

The Reaction Product of 1 Part Hydroabietyl Alcohol, 1 Part Octadecyl Amine and Isophorone Diisocyanate About 120.1 grams (0.338 moles) of hydroabietyl alcohol[53] and about 75.0 grams (0.338 moles) of isophorone diisocyanate[54] was added to a 500 ml three-neck resin kettle equipped with a Trubore stirrer, an N2 atmosphere inlet, and a thermocouple-temperature controller. Agitation was begun and then about 0.22 grams of dibutyltindilaurate[55] catalyst was added and the reaction mixture heated to about 90° C. under an $N_2$ atmosphere. After 1 hour at about 90° C. the temperature was increased to about 110° C. and held for 2 hours. About 89.93 grams (0.338 moles) of octadecyl amine[56] was added and the temperature raised to about 130°

C. and held for approximately 2 hours. An FT-IR of the reaction product was run to insure all of the NCO functionality was consumed. The absence (disappearance) of a peak at about 2285 cm$^{-1}$ (NCO) and the appearance (or increase in magnitude) of peaks at about 1705–1635 cm$^{-1}$ and about 1515–1555 cm$^{-1}$ corresponding to urea frequencies and about 1740–1680 cm$^{-1}$ and about 1540–1530 cm$^{-1}$ corresponding to urethane frequencies were used to confirm this. The final mixed urethane/urea resin product was poured into aluminum molds and allowed to cool and harden. This final product was a clear solid resin at room temperature characterized by the following physical properties: viscosity of about 15.7 cPs as measured by a Ferranti-Shirley cone-plate viscometer at about 140° C., a melting point of from about 73.2° C. to about 110° C. as measured by an electrothermal capillary melting point apparatus, and a $T_g$ of about 16° C. as measured by differential scanning calorimetry using a DuPont 2100 calorimeter at a scan rate of 20° C./minute.

[53] Abitol E—Hydroabietyl alcohol available from Hercules Inc. of Wilmington, Del.
[54] Desmodur I—Isophorone diisocyanate available from Bayer Corp. of Pittsburg, Pa.
[55] Dibutyltindilaurate available from Aldrich Chemicals of Milwaukee, Wis.
[56] Octadecyl amine (technical grade) available from ACROS Organics of New Jersey.

While the invention has been described above with reference to specific embodiments thereof, it is apparent that many changes, modifications and variations can be made without departing from the inventive concept disclosed herein. For example, it should be noted where a urethane reaction product is obtained, a single alcohol precursor or multiple alcohol precursors may be used with an appropriate isocyanate as long as the required stoichiometric ratio is maintained. Similarly, where a urea is the reaction product, a single amine precursor or multiple amine precursors may employed as long as the required stoichiometric ratio is maintained. Where a urethane/urea reaction product is obtained, single or multiple alcohol and amine precursors may be employed within the appropriate stoichiometric ratios. Accordingly, it is intended to embrace all such changes, modifications and variations that fall within the spirit and broad scope of the appended claims.

What is claimed is:

1. A composition comprising:

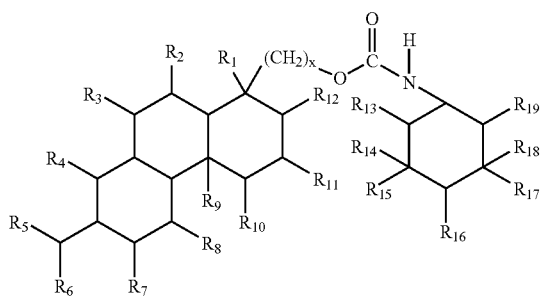

wherein each of $R_1$–$R_{19}$ contain a moiety independently selected from the group consisting of hydrogen, alkyl groups, aryl groups, arylalkyl groups, alkylaryl groups, and heterocyclic groups; wherein one or more of $R_1$–$R_{19}$ are included by a ring structure; and wherein $(CH_2)_x$ denotes one or more methylene groups.

2. The composition of claim 1 wherein one or more of $R_1$–$R_{19}$ are methyl groups and one or more of $R_1$–$R_{19}$ are not methyl groups, and wherein one or more of $R_1$–$R_{19}$ which are not methyl groups are hydrogen.

3. A composition comprising:

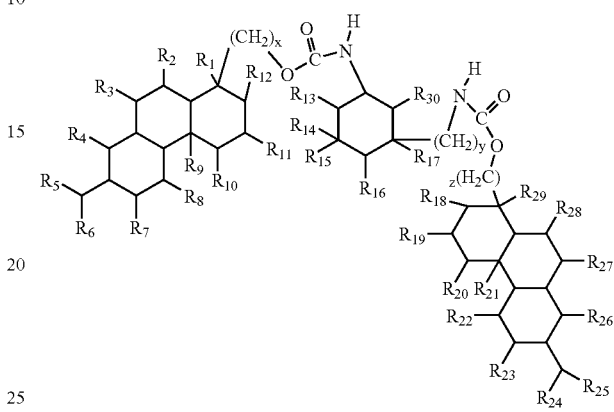

wherein each of $R_1$–$R_{30}$ contain a moiety independently selected from the group consisting of hydrogen, alkyl groups, aryl groups, arylalkyl groups, alkylaryl groups, and heterocyclic groups; and wherein each of $(CH_2)_x$, $(CH_2)_y$, and $(CH_2)_z$ independently denote one or more methylene groups.

4. The composition of claim 3 wherein one or more of $R_1$–$R_{30}$ are methyl groups and one or more of $R_1$–$R_{30}$ are not methyl groups, and wherein one or more of the $R_1$–$R_{30}$ which are not methyl groups are hydrogen.

5. A composition comprising:

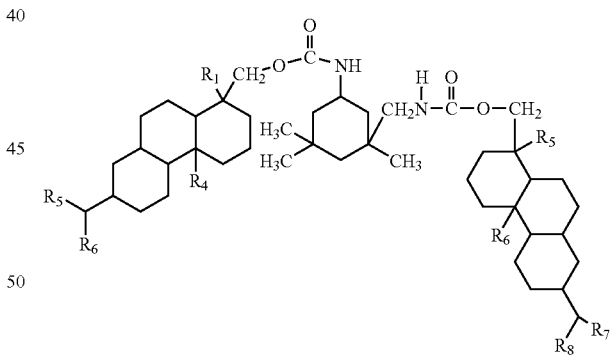

wherein each of $R_1$, $R_2$, $R_3$, $R_4$, $R_5$, $R_6$, $R_7$ and $R_8$ contain a moiety independently selected from the group consisting of hydrogen, alkyl groups, aryl groups, arylalkyl groups, alkylaryl groups, and heterocyclic groups.

6. The composition of claim 5 wherein $R_1$, $R_2$, $R_3$, $R_4$, $R_5$, $R_6$, $R_7$ and $R_8$ are methyl groups.

* * * * *